United States Patent

Wei

[11] Patent Number: 5,647,126
[45] Date of Patent: Jul. 15, 1997

[54] METHOD FOR FABRICATION OF A TWO PIECE VEHICLE WHEEL HAVING A ROLLED CONNECTION BETWEEN SECTIONS

[75] Inventor: Daniel C. Wei, Ann Arbor, Mich.

[73] Assignee: Hayes Wheels International, Inc., Romulus, Mich.

[21] Appl. No.: 569,622

[22] Filed: Dec. 8, 1995

[51] Int. Cl.⁶ .................................................. B23P 19/00
[52] U.S. Cl. ........................... 29/894.322; 301/63.1
[58] Field of Search ............... 29/894.322, 894.351; 301/63.1

[56] References Cited

U.S. PATENT DOCUMENTS

| 1,376,205 | 4/1921 | Hoffman | 301/63.1 |
| 3,506,311 | 4/1970 | Nobach . | |
| 3,612,614 | 10/1971 | Ware . | |
| 3,859,704 | 1/1975 | Nasson . | |
| 4,256,348 | 3/1981 | Lester et al. | 301/63.1 |
| 4,363,347 | 12/1982 | Baumgartner . | |
| 4,518,204 | 5/1985 | Takada . | |
| 5,018,795 | 5/1991 | Engerand et al. . | |
| 5,257,455 | 11/1993 | Iwatsuki . | |
| 5,344,219 | 9/1994 | Adrian et al. . | |
| 5,421,642 | 6/1995 | Archibald . | |

FOREIGN PATENT DOCUMENTS

| 28393 | 5/1981 | European Pat. Off. | 29/894.322 |
| 0 096 399 | 12/1983 | European Pat. Off. . | |
| 3503882A1 | 8/1986 | Germany . | |
| 59-32502 | 2/1984 | Japan . | |
| 7-237044 | 9/1995 | Japan . | |
| 2586 | 6/1985 | WIPO | 301/63.1 |

Primary Examiner—P. W. Echols
Attorney, Agent, or Firm—McMillan, Sobanski & Todd

[57] ABSTRACT

A method for fabricating a vehicle wheel having a wheel rim mechanically rolled onto a wheel disc. The wheel disc includes at least one continuous circumferential bead or groove. During the rolling operation a complementary groove or bead is formed in the wheel rim. The bead is received by the groove to mechanically secure to the wheel rim to the wheel disc. A resilient material including an adhesive is disposed between the wheel disc and the wheel rim. The adhesive bonds the wheel rim to the wheel disc while the resilient material forms air-tight seal therebetween.

19 Claims, 3 Drawing Sheets

5,647,126

METHOD FOR FABRICATION OF A TWO PIECE VEHICLE WHEEL HAVING A ROLLED CONNECTION BETWEEN SECTIONS

BACKGROUND OF THE INVENTION

This invention relates in general to vehicle wheels and in particular to a method for fabricating two piece wheels having a wheel rim rolled onto to a separately formed wheel disc to form a mechanical connection therebetween.

It is known in the art to fabricate a vehicle wheel by attaching a wheel rim to a separately formed wheel disc. Typically, the wheel rim is rolled from steel strip stock and the disc is stamped from steel sheet stock. The rim is welded to the disc to form the wheel. Such a wheel is shown in U.S. Pat. No. 5,257,455 to Iwatsuki. Alternately, the wheel rim can be rolled from steel and the wheel disc cast or forged from a light weight metal, such as aluminum, titanium or magnesium, or an alloy of a light weight metal. Because the metals forming the rim and disc are different, a ferrous weld anchor is usually attached to wheel disc. The wheel rim is welded to the weld anchor to assure that a good weld is formed between the rim and disc. Such a wheel is described in U.S. Pat. No. 3,506,311 to Nobach and is commonly referred to a bimetal wheel. A bimetal wheel combines the economy, flexibility and strength of a steel rim with the pleasing ornamental appearance of three dimensional contours formed in a cast or forged wheel disc.

To enhance the appearance of a two piece wheel, it is known to attach a full face wheel disc which includes the outboard tire retaining flange to a partial wheel rim to form a full face bimetal wheel. When a tire is mounted upon a full face wheel, the joint between the wheel disc and wheel rim is completely hidden and only the wheel disc is visible. A decorative finish is often applied to the face of the wheel disc to further enhance the appearance of the wheel. Examples of typical decorative finishes include metal plating, such as chromium plating, clear coatings and paint.

Referring now to the drawings, there is shown in FIG. 1 a fragmentary sectional view of a typical prior an bimetal full face wheel 10. The wheel 10 is described in the Nobach patent listed above and includes a full face wheel disc 11 formed from a light weight metal or light weight metal alloy by a conventional process, such as gravity, low pressure or die casting. The full face wheel disc 11 includes a central wheel hub 12 which is supported by a plurality of wheel spokes 13 (one shown) within an annular sidewall 14. An outboard tire bead retaining flange 15 extends in a radial outward direction from the sidewall 14. The wheel disc 11 also includes a ring-shaped weld anchor 16 formed from a ferrous material, such as steel, which is partially embedded in the wheel disc sidewall 14. A portion of the weld anchor 16 is exposed to form a welding surface 17. The sidewall 14 further includes a cylindrically-shaped collar 18 which extends axially from the inboard side of the flange 15. The collar 18 extends radially over a portion of the weld anchor 16 to secure the weld anchor 16 to the wheel disc 11.

A conventional partial wheel rim 20 is attached to the inboard side of the wheel disc 11. The wheel rim 20 is formed from steel strip stock with conventional rim roll forming machinery. The wheel rim 20 includes an inboard end 21 which terminates in a conventional inboard tire bead retaining flange 22. An inboard tire bead seat 23 and inboard safety bead 23A are also formed on the inboard end 21 of the wheel rim 20. A leg portion 24 extends in an outward axial direction from the inboard safety bead 23A. A deepwell 25 is formed in the wheel rim 20 adjacent to the leg portion 24. The wheel rim 20 also includes a cylindrically-shaped outboard end 26 which is adjacent to the deepwell 25. The outboard wheel rim end 26 includes an outboard tire bead seat 27 and outboard safety bead 27A. The outboard rim end 26 extends over the wheel disc collar 18 and into contact with the welding surface 17 of the weld anchor 15. The outboard rim end 26 and the wheel disc collar 18 are sized to form a clearance fit therebetween, allowing the wheel rim 20 to be rotated relative to the wheel disc 11.

A continuous circumferential air-tight weld 28 is formed between the wheel rim 20 and the weld anchor 16. Typically, a conventional friction or inertial welding process is used to form the weld 28. During the welding process, the wheel disc 11 is held stationary while the wheel rim 20 is rotated with the outboard rim end 23 pressed against the weld anchor 16. The heat generated by friction partially melts the outboard wheel rim end 26 and the adjacent portion of the weld anchor 16 to form the weld 28.

An alternate structure for the weld anchor is disclosed in U.S. Pat. No. 5,421,642 to Archibald where the weld anchor includes an annular collar which is received by the outboard end of a partial wheel rim. The weld anchor collar positions the wheel rim on the wheel disc.

While the wheel disc is typically welded to the wheel rim, it is also known to heat shrink the wheel rim onto the wheel disc, as shown in U.S. Pat. No. 4,363,347 to Baumgartner and European Patent Application No. 0 096 399 to Stahlschmidt & Malwurm GmbH & Co. KG. The U.S. Patent discloses wheel structures having either cylindrical or conical shrinkage surfaces. The U.S. Patent also discloses optional cutting or rolling of threads on the cylindrical shrinkage surfaces to allow the disc to be threadedly attached to the wheel rim. The European Patent Application discloses conical shrinkage surfaces. The European Patent Application further discloses optional forming of cleats and corresponding grooves, which receive the cleats, on the shrinkage surfaces.

SUMMARY OF THE INVENTION

This invention relates to a process for fabricating a two piece vehicle wheel by rolling a wheel rim onto a wheel disc to form an interlocking bead and groove which mechanically secure the wheel rim to the wheel disc.

As described above, two piece vehicle wheels typically include a wheel disc welded to a wheel rim which is formed by a rolling or spinning operation. The heat of welding has been know to warp the wheel disc and/or the wheel rim. Also, a layer of oxidized metal can form on the welding surface of the wheel disc and on the adjoining surface of the partial wheel rim. This layer of oxidized metal can prevent formation of a satisfactory weld between the wheel disc and wheel rim. When a partial wheel rim is welded to a full face wheel disc, oxidation on the welding surface can prevent formation of an air-tight weld between the wheel rim and the wheel disc. As a result, tire inflation air may leak from a tire mounted upon the assembled wheel. Additional metal oxidization can occur if the wheel disc is subjected to a plating process to form a decorative layer on the visible portion of the wheel disc.

The heat generated by the welding operation used to attach the wheel rim to the wheel disc can damage the decorative finish of the wheel disc. If the wheel finish is flawed, the entire wheel must be scrapped. It is known to delay applying the decorative finish to the wheel disc until after the wheel is welded; however, this requires a more complex manufacturing process. Thus, it would be desirable to fabricate two piece wheels without a welding operation. This would eliminate the potential of heat damage to the wheel, allow application of the decorative finish to the wheel disc before assembly of the wheel and reduce the scrap rate for assembled wheels.

The present invention contemplates a process for fabricating a vehicle wheel which includes providing an annular wheel rim having an outboard end which defines a cylindrical inner surface. A circular wheel disc having a central hub connected by a plurality of wheel spokes to an annular-shaped sidewall also is provided. The wheel disc sidewall includes a cylindrical outer surface which has at least one bead or groove formed thereon. The wheel rim is positioned on the wheel disc with a portion of the wheel rim outboard end extending axially over a portion of the wheel disc sidewall and with the cylindrical inner surface of the wheel rim adjacent to the cylindrical outer surface of the wheel disc sidewall. The outboard wheel rim end is mechanically rolled onto the wheel rim, forcing the overlapping portion of the wheel rim onto the cylindrical outer surface of the wheel disc sidewall. The rolling operation forms a groove or bead on the cylindrical inner surface of the wheel rim. The groove receives the corresponding bead to mechanically secure the wheel rim to the wheel disc.

The invention further contemplates that the bead and groove can be continuous and circumferential. Additionally, the invention can be practiced with a plurality of beads or grooves formed on the wheel disc. Accordingly a plurality, of complementary grooves or beads will be formed on the inner rim surface during the rolling operation. The invention also contemplates that the plurality of beads define parallel planes.

A resilient material can be applied to the wheel rim or the wheel disc before positioning the rim over the disc. As the wheel rim is rolled onto the wheel disc, the resilient material is compressed to form an air-tight seal between the wheel rim and the wheel disc. An adhesive can be included in the resilient material to further secure the wheel rim to the wheel disc. Alternately, the wheel rim can be brazed, welded or soldered to the wheel disc.

Optionally, the outboard end of the wheel rim can be heated to radially expand the inside diameter thereof sufficiently to fit over beads formed on the wheel disc and to make the rim end more pliable for the rolling operation. After rolling the wheel rim onto the wheel disc, the wheel rim is shrink fitted onto the wheel disc as the wheel assembly cools.

Various objects and advantages of this invention will became apparent to those skilled in the an from the following detailed description of the preferred embodiment, when read in light of the accompanying drawings.

DETAILED DESCRIPTION OF THE PREFERRED EMBODIMENT

Figure 1:
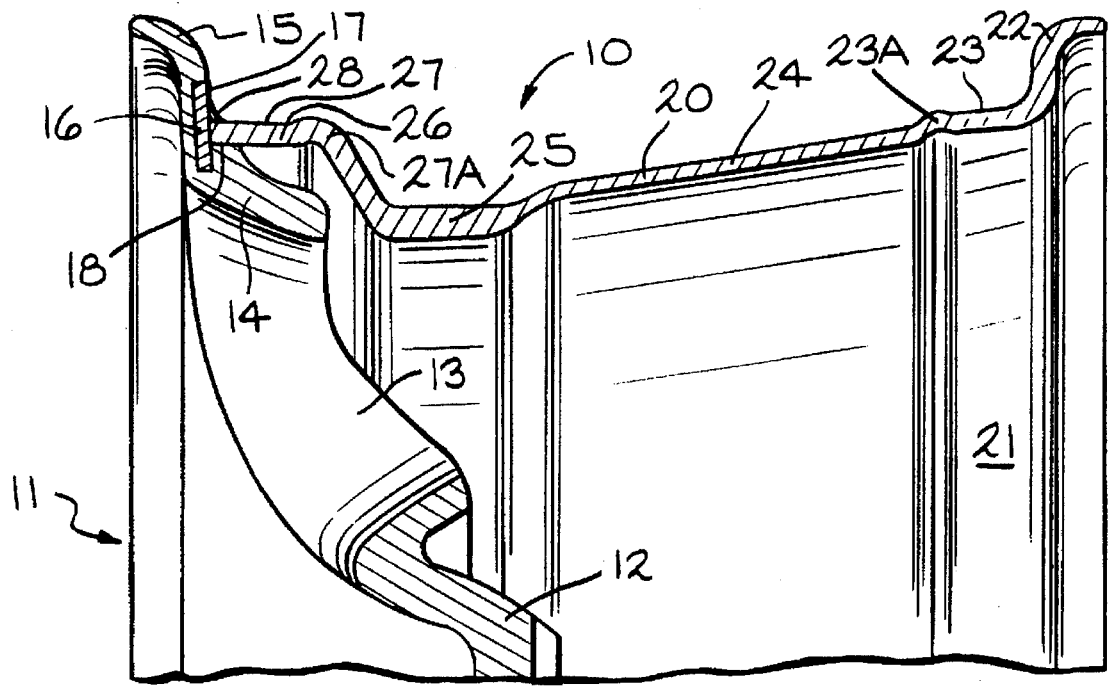
FIG. 1 is a fragmentary sectional view of a prior art two piece wheel.
Figure 2:
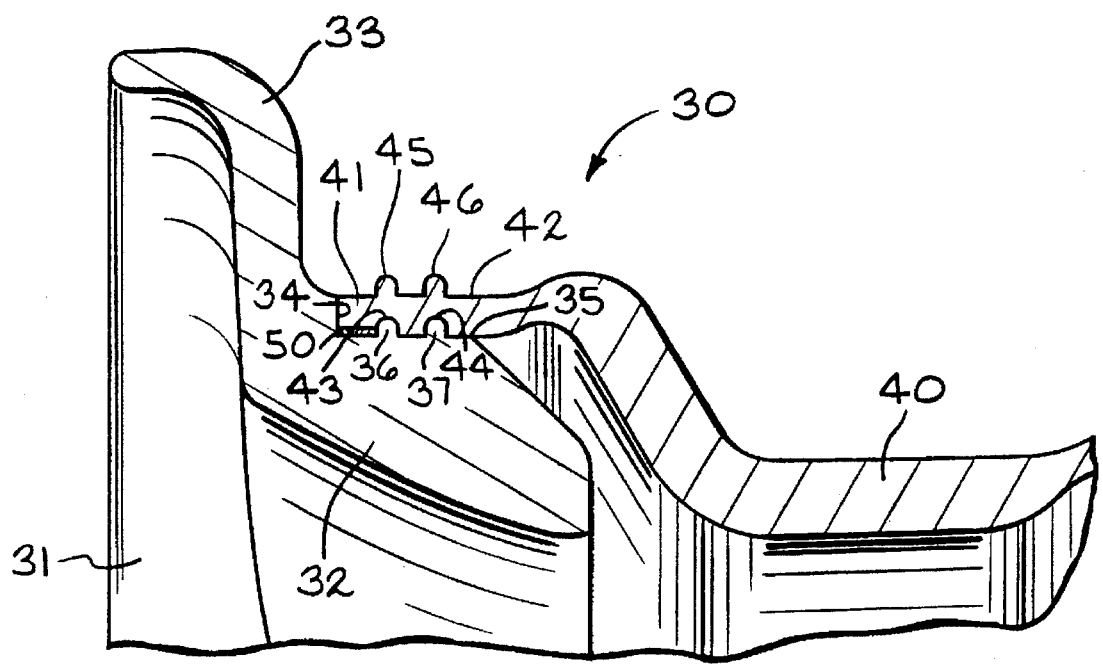
FIG. 2 is a fragmentary sectional view of a two piece wheel fabricated in accordance with the invention.

Referring again to the drawings, there is illustrated in FIG. 2 a fragmentary sectional view of a two piece wheel 30 fabricated in accordance with the invention. In the preferred embodiment, the wheel 30 is a bimetal wheel which includes a full face wheel disc 31 formed from a light weight metal, such as aluminum, titanium or magnesium, or an alloy of a light weight metal, by a conventional process, such as casting or forging. While the preferred embodiment includes a wheel disc formed from a light weight metal, it will be appreciated that the wheel disc also can be stamped or forged from steel or stainless steel or formed from a plastic. Additionally, the wheel disc can be cast from stainless steel with the Hitchnet process. In the preferred embodiment, the wheel disc 31 includes a decorative surface finish (not shown). For example, a layer of plating, such as chrome plating, can be deposited upon a portion of the wheel disc surface, or a layer of paint or a clear coating can be applied to the wheel disc 31.

While the preferred embodiment is described below for a bimetal wheel, it will be appreciated that the invention also can be practiced on a wheel having a disc and rim formed from the same metal, different alloys of the same metal or plastics. For example, a wheel rim formed from a first alloy of aluminum can be attached to a wheel disc formed from a second alloy of aluminum, where the second alloy of aluminum is different from the first alloy of aluminum. Similarly, the invention also contemplates attaching a plastic wheel rim to a plastic wheel disc to form a wheel.

In the preferred embodiment shown in FIG. 2, the wheel disc 31 includes an annular-shaped sidewall 32. An outboard tire bead retaining flange 33 extends in an outward radial direction from the sidewall 32. The inboard portion of the sidewall 32 has a reduced outer radius which forms a shoulder 34 and an annular collar 35. The collar 35 has a generally cylindrical outer surface which extends axially from the shoulder 34 toward the inboard end of the wheel 30.

A plurality of parallel continuous circumferential beads, two of which, 36 and 37, are shown in FIG. 2, are formed on the outer surface of the collar 35. The beads 36 and 37 define parallel planes which are spaced apart axially and are perpendicular to the axis of the wheel 30. While two beads 36 and 37 are shown in FIG. 2, the invention also can be practiced with more than two beads or with a single bead formed on the outer surface of the collar 35.

A conventional wheel rim 40, which in the preferred embodiment is a partial wheel rim formed from steel, is attached to the wheel disc 31. The wheel rim 40 can be formed from steel strip stock with conventional rim roll forming machinery. It will be appreciated that the invention also can be practiced with a wheel rim formed with a casting or forging process. Additionally, the wheel rim can be formed from a light weight metal, such as aluminum, titanium or magnesium, an alloy of a light weight metal, a plastic or stainless steel. The wheel rim 40 can optionally include a decorative finish (not shown). For example, a layer of plating, such as chrome plating, can be deposited upon a portion of the wheel rim surface, or a layer of paint or a clear coating can be applied to the wheel rim 40.

The wheel rim 40 has a cylindrical outboard end 41 which includes a portion of an outboard tire bead seat 42. For reasons which will be explained below, the rim end 41 has a thinner cross section than the remainder of the wheel rim 40. Generally, the thickness of the rim end 41 is a function of the ductility of the material forming the wheel rim 40. The outboard rim end 41 extends over the wheel disc collar 35 and contacts the wheel disc shoulder 34.

As will be explained below, the rim end 41 is rolled onto the wheel disc collar 35. During the rolling process, the rim end 41 is worked to conform to the shape of the collar 35. During the rolling process, the rim end is deformed over the collar beads 36 and 37 to form a pair of grooves 43 and 44 on the inside surface of the rim end 41. Accordingly, the grooves 43 and 44 are contained in parallel planes which are spaced apart axially and coincide with the planes of the beads 36 and 37. Also, the grooves 43 and 44 have cross sectional shapes which are complementary to the cross sectional shape of the corresponding beads 36 and 37. Because the rim end 41 is relatively thin, a second pair of beads 45 and 46 are formed on the outer surface of the rim end 41 opposite from the grooves 43 and 44 during the rolling operation.

As shown in FIG. 2, the grooves 43 and 44 receive the wheel disc beads 36 and 37 and cooperate therewith to prevent axial movement of the wheel rim 40 relative to the wheel disc 31. Thus, the grooves 43 and 44 and beads 36 and 37 mechanically lock the wheel rim 40 onto the wheel disc 31.

A circumferential air-tight seal 50 is disposed between the wheel disc collar 35 and the wheel rim end 41 to prevent leakage of tire inflation air through the joint formed therebetween. The seal 50 is shown extending axially from the sidewall shoulder 34 to the outboard bead 36 formed on the collar 35. However, the seal 50 also may be disposed between the outboard and inboard beads 36 and 37, between the inboard bead 37 and the inboard end of the collar 35 or over the entire surface of the collar 35. In the preferred embodiment, the seal 50 is formed from a resilient material. Also in the preferred embodiment, the resilient material forming the seal 50 includes an adhesive, such as an epoxy, acrylic or bisphenol. Such adhesives have high shear strength and toughness to resist impact and riser stresses. The adhesive functions to bond, and thereby further secure, the wheel disc 31 to the wheel rim 40.

The preferred embodiment has been illustrated in FIG. 2 with the beads 36 and 37 formed on the wheel disc collar 35 and the corresponding grooves 43 and 44 formed in the wheel rim end 41 by the rolling operation. As will be described below, the invention also can be practiced with a plurality of parallel continuous circumferential grooves formed in the wheel disc collar with the wheel rim end rolled into the grooves to form complementary beads on the inner surface of the wheel rim end 41 (not shown). Additionally, while the beads 36 and 37 and grooves 43 and 44 have been shown in FIG. 2 having generally rounded cross-sectional shapes, the invention also can be practiced with beads and grooves having other corresponding cross-sectional shapes, such as, square, rectangular, elliptical, trapezoidal or triangular.

It will be appreciated that while the rim end 41 has been illustrated as being thinner than the rest of the wheel rim 40, if the metal forming the rim 40 is ductile enough to be rolled onto the wheel disc collar, a thicker rim end can be used. Also, as will be described below, the rolling of the rim end 41 may involve either hot or cold working of the metal.

The invention contemplates a process for fabricating the wheel 30 shown in FIG. 2. The process is illustrated in the flow chart shown in FIG. 3. A wheel disc which has an annular collar is provided in functional block 60. In the preferred embodiment, a full face wheel disc is used with the collar extending axially from the inboard surface thereof. However, it will be appreciated that the invention also can be practiced with a wheel disc or spider which are disposed within a full wheel rim. A plurality of beads or grooves are formed on the outer surface of the wheel disc collar.

A decorative finish is applied to a portion of the wheel disc surface in functional block 61; however, this step is optional. The finish can be a layer of paint or clear coat. Additionally, a decorative finish of plating can be deposited onto a portion of the wheel disc surface. Such layers of plating are typically sealed with a layer of clear coat.

A resilient sealing material, which in the preferred embodiment includes an adhesive, is applied to the collar in functional block 62. Alternately, the resilient sealing material and adhesive can be applied to the inner surface of the wheel rim outboard end.

In functional block 63, a wheel rim is provided. The wheel rim is formed by a conventional process, such as casting, forging or rolling. In the preferred embodiment, a partial wheel rim having a cylindrical outboard end which is relatively thin and does not include grooves or beads is used. A decorative finish can be applied to a portion of the wheel rim surface in functional block 64; however, this step is optional. The decorative finish can be a layer of paint or clear coat. Additionally, a decorative finish of plating can be deposited onto a portion of the wheel rim surface. Such layers of plating are typically sealed with a layer of clear coat.

The outboard end of the wheel rim is heated in functional block 65; however, as will be explained below, this step is optional. For a metal wheel rim, the heating radially expands the rim end, increasing the inside diameter thereof sufficiently to fit over any beads formed on the wheel disc collar. With respect to a plastic wheel rim, heating makes the rim end pliable. The outboard end of the wheel rim is heated by a conventional means, such as electric induction, electric resistance, or infrared heating elements or by placing the wheel rim in a gas-fired or electric resistance furnace.

In block 66, the wheel rim end is positioned over the wheel disc collar to form a wheel assembly. In the preferred embodiment, the outboard end of the partial wheel rim is positioned over the collar extending from the inboard surface of the full face wheel disc with the rim concentric with the wheel disc and the inboard tire retaining flange parallel to the outboard tire retaining flange. The wheel rim and disc can optionally be placed in a fixture (not shown) to assure the proper alignment therebetween. Alternately, the wheel disc or spider is positioned within a full wheel rim with the wheel disc or spider perpendicular to the wheel rim axis.

Figure 4:
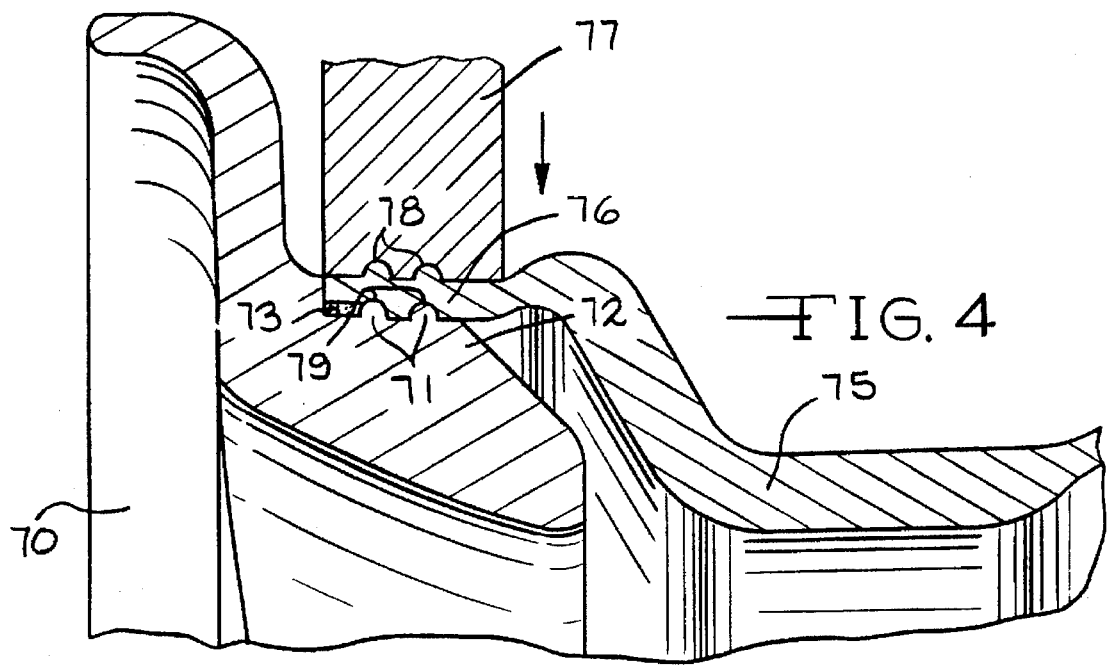
FIG. 4 illustrates the rolling operation included in the flow chart shown in FIG. 3.
Figure 5:
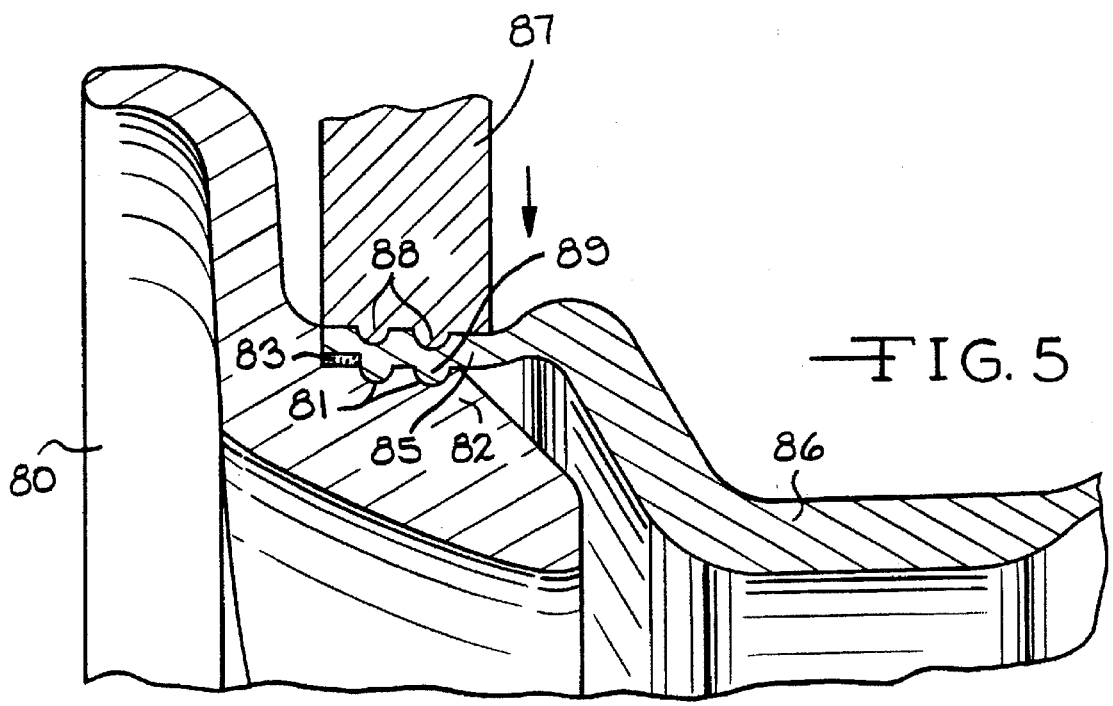
FIG. 5 illustrates an alternate rolling operation which can be included in the flow chart shown in FIG. 3.

The outboard end of the wheel rim is rolled onto the wheel disc collar in functional block 67. In the wheel rim has been heated, the rolling operation is completed before the wheel rim end has cooled. Details of the rolling process are illustrated in FIGS. 4 and 5. FIG. 4 shows a portion of a full face wheel disc 70 having a plurality of parallel continuous circumferential beads 71 formed on an axially extending collar 72. A resilient sealing material 73 is carried on a portion of the outer surface of the wheel disc collar 72. Also shown in FIG. 4 is a partial wheel rim 75 which has a cylindrical outboard end 76 extending over the wheel disc collar 72. As described above, the rim end 76 is not formed with grooves corresponding to the beads 71, since the grooves will be formed during the rolling operation described below. If the wheel rim 75 is formed having an outboard end diameter sufficiently large to clear the wheel disc beads 71 when the wheel rim end 76 is assembled onto the wheel disc collar 72, the wheel rim end 76 does not have to be heated, as shown in functional block 75.

A conventional roll forming machine (not shown) is used to roll the wheel rim end 76 onto the wheel disc collar 72. The rolling machine has a plurality of rollers, one of which, 77 is shown in FIG. 4. The roller 77 has circumferential grooves 78 formed therein which correspond to the wheel disc beads 71. The wheel assembly is rotated while the roller 77 is pressed against the surface of the wheel rim end 76, as shown by the arrow in FIG. 4. The roller 77 forms the wheel rim end 76 over the collar 72 to correspond to the surface shape thereof. The roller grooves 78 press a portion of the rim end 76 over the wheel disc beads 71 to form corresponding grooves 79 therein. As described above, the grooves 79 formed in the wheel rim end 76 cooperate with the wheel disc beads 71 to mechanically lock the wheel rim 75 on the wheel disc collar 72. The roller 77 also presses the wheel rim end 76 against the surface of the wheel disc collar 72, thereby compressing the resilient material and adhesive 73 to form an air-tight seal between the wheel rim and the wheel disc.

An alternate rolling process is shown in FIG. 5 where a wheel disc 80 has a plurality of parallel continuous circumferential grooves 81 formed in an axially extending collar 82. A resilient sealing material and adhesive 83 is carried on the collar 82. As described above, an outboard end 85 of a partial wheel rim 86 is positioned over the wheel disc collar 82. The wheel rim 86 does not have beads formed on the outboard end 85 since the beads will be formed during a rolling operation. Accordingly, it may not be necessary to heat the wheel rim end, as indicated in functional block 85 in FIG. 3, before assembling the wheel. Certain materials, however, will require heating before the rolling operation. For example, the outboard end of a plastic wheel rim would be heated to increase the ductility of the plastic. A conventional rolling machine (not shown) rolls the wheel rim end 85 onto the wheel disc collar 82. The rolling machine includes a plurality of rollers, one of which, 87, is shown. The roller 87 has a plurality of circumferential beads 88 formed thereon which correspond to the grooves 81 formed in the wheel disc collar 82. The roller 87 forms the wheel rim end 85 over the collar 82 to correspond to the surface shape thereof. The roller beads 88 press a portion of the rim end 85 into the wheel disc grooves 81 to form corresponding beads 89 therein. As described above, the beads 89 formed in the wheel rim end 85 cooperate with the wheel disc grooves 81 to mechanically lock the wheel rim 86 on the wheel disc collar 82.

Figure 3:
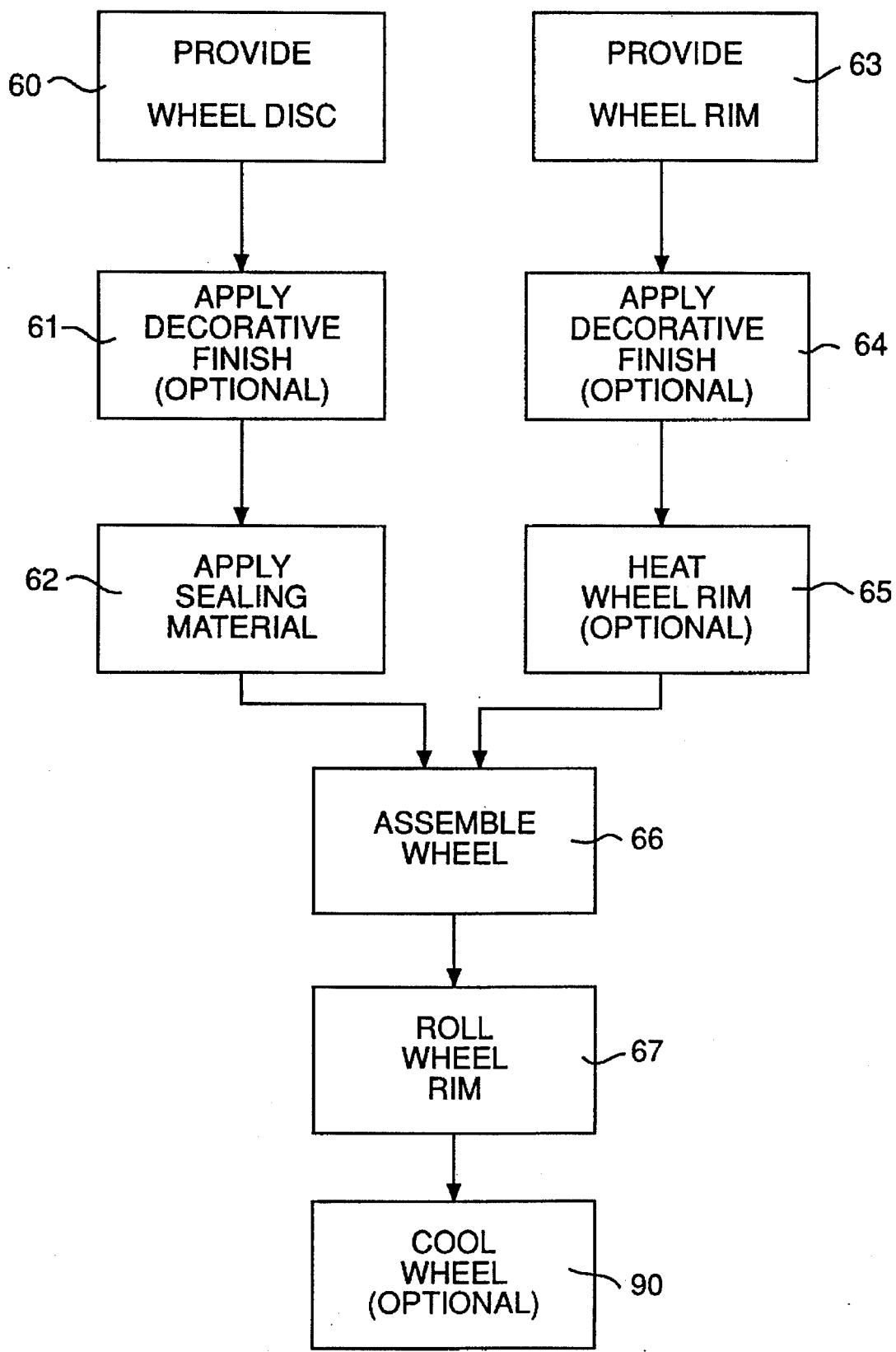
FIG. 3 is a flow chart for fabricating the wheel shown in FIG. 2.

If the wheel rim was heated in functional block 65, the assembled wheel is cooled in functional block 90. As shown in FIG. 3, cooling is an optional step. However, following the rolling operation, the adhesive contained in the resilient material 73 is cured to further secure the wheel rim to the wheel disc.

While the preferred embodiment of the rolling process has been illustrated in FIGS. 4 and 5 with two beads cooperating with two grooves to mechanically lock the wheel rim onto the wheel disc, it will be appreciated that the process shown in FIG. 3 can be applied to wheels having more than two beads and grooves or to wheels having a single bead and groove Additionally, while the process was described with an adhesive further securing the wheel rim to the wheel disc, it is also possible to weld, braze or solder the wheel rim the wheel disc following the rolling operation. When the wheel rim is welded to the wheel disc, the resilient sealing material is omitted and a continuous circumferential air-tight weld is formed between the wheel rim and the wheel disc. If the wheel rim is brazed or soldered to the wheel disc, brazing filler metal or solder is applied to the wheel disc or rim instead of the resilient sealing material. Furthermore, while the preferred embodiment has been illustrated in FIGS. 2, 4 and 5 with a full face wheel disc attached to a partial wheel rim, the process also can be used to attach a wheel disc or spider to a full wheel rim, as has been described above. In such a case an air-tight seal is not needed between the wheel disc and the wheel rim.

As described above, in the preferred embodiment, the wheel disc provided in functional block 60 can receive a decorative finish in functional block 61, such as painting or plating, before being attached to the wheel rim. Similarly, the wheel rim provided in functional block 63 can receive a decorative finish in functional block 64. In prior art wheel fabrication processes which include welding wheel discs having plated or painted finishes, such decorative finishes could be damaged by the heat generated when the wheel rim is welded to the wheel disc. Accordingly, in such prior art processes, the painting or plating is typically applied to the wheel after welding which requires a more complex manufacturing process. Thus, the present invention simplifies the manufacture of two piece wheels because the decorative finishes can be applied to the wheel components before they are assembled. Because the coating is not damaged during assembly, corrosion protection provided thereby is maintained.

Additionally, in the prior art processes, if there is a blemish in the decorative finish, the entire wheel has to be scrapped. With the present invention, any wheel discs or rims which have unsatisfactory finishes can be rejected before assembly of the wheel. This eliminates needless scraping of unblemished components and reduces the total scrap rate. Also, oxidation of the wheel disc and rim surfaces does not affect the air-tight seal formed therebetween.

Use of an adhesive instead of welding to bond together the wheel components eliminates welding heat and fumes during fabrication of the wheel. This simplifies the wheel manufacturing facility since heat and fume removal equipment are not required.

It will be appreciated that, while the preferred embodiment has been described as having a resilient material which includes an adhesive disposed between the wheel rim and wheel disc, the invention also can be practiced with only an adhesive disposed between the wheel rim and wheel disc.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A process for fabricating a vehicle wheel comprising the steps of:
   (a) providing an annular wheel rim, the wheel rim having an outboard end which defines a cylindrical inner surface, and a circular wheel disc, the wheel disc having a central hub connected by a plurality of wheel spokes to an annular-shaped sidewall, the sidewall including a cylindrical outer surface, the cylindrical outer surface having one of at least one bead and at least one groove formed thereon;
   (b) positioning the wheel rim on the wheel disc with a portion of the wheel rim outboard end extending axially over a portion of the wheel disc sidewall and with the cylindrical inner surface of the wheel rim adjacent to the cylindrical outer surface of the wheel disc sidewall, the wheel rim and wheel disc forming a wheel assembly; and
   (c) rolling the wheel assembly with mechanical rollers to force the portion of the wheel rim extending over the portion of the wheel disc sidewall onto the cylindrical outer surface of the wheel disc sidewall and to form the other of the groove and bead on the cylindrical inner surface of the wheel rim, the groove receiving the corresponding bead to mechanically secure the wheel rim to the wheel disc.

2. A process for fabricating a vehicle wheel as described in claim 1 wherein the bead and groove are continuous and circumferential.

3. A process for fabricating a vehicle wheel as described in claim 2 wherein the outer surface of the wheel disc provided in step (a) has one of a plurality of beads and grooves formed thereon and further wherein the rolling operation in step (c) forms the other of the plurality of beads and grooves on the cylindrical inner surface of the wheel rim, the grooves receiving corresponding beads to mechanically secure the wheel rim to the wheel disc.

4. A process for fabricating a vehicle wheel as described in claim 3 wherein the plurality of beads define parallel planes.

5. A process for fabricating a vehicle wheel as described in claim 4 wherein the wheel disc provided in step (a) is a full face wheel disc having an outboard tire retaining flange, the cylindrical outer surface extending axially from the inboard surface of the sidewall and the wheel rim provided in step (a) is a partial wheel rim having an inboard tire retaining flange and a cylindrical outboard end, and further wherein the wheel rim is positioned in step (b) with the wheel rim concentric to the wheel disc and the inboard tire retaining flange parallel to the outboard tire retaining flange.

6. A process for fabricating a vehicle wheel as described in claim 5 wherein step (a) includes applying a resilient material to one of the cylindrical inner surface of the wheel rim and the cylindrical outer surface of the wheel disc sidewall and further wherein the resilient material is compressed in step (c) to form an air-tight seal between the wheel rim and the wheel disc.

7. A process for fabricating a vehicle wheel as described in claim 6 wherein the resilient material applied in step (a) includes an adhesive.

8. A process for fabricating a vehicle wheel as described in claim 7 wherein the adhesive is selected from the group of epoxy, acrylic and bisphenol.

9. A process for fabricating a vehicle wheel as described in claim 4 wherein step (a) includes applying a resilient material to one of the cylindrical inner surface of the wheel rim and the cylindrical outer surface of the wheel disc sidewall.

10. A process for fabricating a vehicle wheel as described in claim 9 wherein the resilient material applied in step (a) includes an adhesive.

11. A process for fabricating a vehicle wheel as described in claim 10 wherein the adhesive is selected from the group of epoxy, acrylic and bisphenol.

12. A process for fabricating a vehicle wheel as described in claim 10 including, subsequent to step (a), applying heat to the outboard end of the wheel rim to expand the end in an outward radial direction.

13. A process for fabricating a vehicle wheel as described in claim 12 including, subsequent to step (c), cooling the wheel.

14. A process for fabricating a vehicle wheel as described in claim 1 wherein step (a) includes applying a brazing filler metal to one of the cylindrical inner surface of the wheel rim and the cylindrical outer surface of the wheel disc sidewall and subsequent to step (c) heat is applied to the wheel assembly to braze the wheel rim to the wheel disc.

15. A process for fabricating a vehicle wheel as described in claim 1 wherein step (a) includes applying a soldering filler metal to one of the cylindrical inner surface of the wheel rim and the cylindrical outer surface of the wheel disc sidewall and subsequent to step (c) heat is applied to the wheel assembly to solder the wheel rim to the wheel disc.

16. A process for fabricating a vehicle wheel as described in claim 1 further including, subsequent to step (c), forming an air-tight circumferential weld between the wheel rim and the wheel disc.

17. A process for fabricating a vehicle wheel as described in claim 1 wherein step (a) includes applying a resilient material to one of the cylindrical inner surface of the wheel rim and the cylindrical outer surface of the wheel disc sidewall and further wherein the resilient material is compressed in step (c) to form an air-tight seal between the wheel rim and the wheel disc.

18. A process for fabricating a vehicle wheel as described in claim 17 wherein the resilient material applied in step (a) includes an adhesive.

19. A process for fabricating a vehicle wheel as described in claim 18 wherein the adhesive is selected from the group of epoxy, acrylic and bisphenol.

* * * * *